Feb. 9, 1960  G. NOMARSKI  2,924,142
INTERFERENTIAL POLARIZING DEVICE FOR STUDY OF PHASE OBJECTS
Filed May 11, 1953  3 Sheets-Sheet 1

Georges Nomarski
Inventor
By Allen & Allen
attys

Georges Nomarski
Inventor
By Allen + Allen
attys

Feb. 9, 1960  G. NOMARSKI  2,924,142
INTERFERENTIAL POLARIZING DEVICE FOR STUDY OF PHASE OBJECTS
Filed May 11, 1953  3 Sheets-Sheet 3

Georges Nomarski Inventor
By Allen & Allen Attys

United States Patent Office 2,924,142
Patented Feb. 9, 1960

2,924,142

INTERFERENTIAL POLARIZING DEVICE FOR STUDY OF PHASE OBJECTS

Georges Nomarski, Paris, France, assignor to Etablissement Public dit: Centre National de la Recherche Scientifique, Paris, France Application May 11, 1953, Serial No. 354,362

Claims priority, application France May 14, 1952

13 Claims. (Cl. 88—14)

There exist a large number of optical instruments which utilize diffraction and interference phenomena, making it possible to reproduce more or less faithfully, the real contour of a reflecting surface or to determine the distribution of refraction indices combined with thickness variations in a transparent body. The present invention concerns a device which makes visible the optical structure of an object which does not modify substantially the intensity of the transmitted or reflected beam. Such an object is called a "phase object," as it acts on the phase of the incident wave and not on the amplitude thereof. Now the difference in phase being not perceptible to the eye, it is thus necessary to have amplitude variations corresponding to the phase variations.

The device according to the present invention, mainly provided for studying transparent bodies or reflecting surfaces and which do merely have an action on the phase of the light waves, essentially comprises a light source giving a coherent illumination, a first optical system giving a real image of the source, which is located after the object in the direction of light beam, an interferential polarizing system having at least one main blade or birefringent wedge placed perpendicularly to said beam after the object, the fringes caused by said system being localized at the point of the image of the source, and a second optical system or ocular system, for observing or recording the effective image of the phase object, the pupil of said second system being at a small distance from said main blade.

The interferential polarizing system is for instance a compound of two polarisers of any suitable type and optically suitably located one with respect to each other, and constituting the end elements of said system. Between the polarizers, there are disposed at least one main blade and, if desired, one secondary blade, as will be explained hereinafter.

The crystal blade, or birefringent wedge which will be called, hereinafter the "main blade," is placed perpendicular to the beam between two polarizers at a small distance from the pupil of an optical instrument provided for the observation or photography of transparent or reflecting objects belonging to the class of phase objects. This blade is obtained from a plane and parallel faced blade, the thickness of which is modified either in one direction only or radially, preserving the symmetry of revolution, the thickness varying from center to edge according to any law.

The crystal blade, which will be called hereinafter an "auxiliary blade," is placed at any point on the axis, between the two polarizers. This blade may be plane and parallel faced or deviate more or less from parallelism. It is characterized by the value of its bi-refringence which is—at its center—equal and opposite in sign to that offered by the main blade at its center. According to the various embodiments of the device, there may be provided a number of other crystal blades either associated or not with the main and secondary or auxiliary blades above referred to.

Let us take a bi-refringent crystal blade cut along any plane but at an angle between 0° and 45° to the axis. If the blade is not of uniform thickness, it is well known that there may be observed, in polarized light, a system of interference fringes, visible in monochromatic light. Such a blade, slightly prismatic for instance, in placed in the pupil of an optical instrument set for a finite distance. The object, for instance a transparent microscope preparation, being placed in position, the image of a slot limiting the aperture of an optical lighting system, is projected through the latter, on the system of interference fringes which forms on the prismatic blade itself or at a small distance therefrom. Before reaching the blade or bi-refringent wedge, the light from the slot source goes through the condenser, the object examined and perhaps one or more optical elements of the associated instrument.

In order to be able to use white light, there is placed on the path, for instance close to the slot source, another crystal blade, plane and parallel faced for example, with such a thickness and orientation that its bi-refringence compensates substantially that of the prismatic blade at the point where the image of the light source is projected on it. If the two blades are between two crossed polarizers, the object is observed on a black or gray background, according to whether the image of the slot source coincides exactly or not with the black interference fringe of the so-called "main" prismatic blade, placed in the vicinity of one pupil in the observation instrument. The first polarizer is oriented at 45° to the neutral lines of the first crystal blade, for giving identical amplitudes to the polarized waves, emerging at right angle from said blade. Since, by hypothesis, the auxiliarily blade compensates exactly the bi-refringence of the main blade, the light which arrives on the image is destroyed by interference, owing to the second polarizer crossed with the first one, the phase difference between the two polarized waves being equal to $\pi$. This is strictly true only in the absence of any object.

The phase structure of said object causes in the beam small local deviations which have the effect of spreading the pupil image of the slot. Now the transmission of light amplitudes (complex) varies rapidly in a direction perpendicular to the interference fringes in polarized light, i.e. perpendicularly to the edge of the dihedron formed by the faces of said blade or birefringent wedge.

The amplitude and phase of the light going through the pupil are entirely determined by the distance which separates the black fringe from the point through which passes the ray from a phase shifting detail of the object. Now this ray is more or less deflected according to the local value of the slope, of the variation in optical path introduced by the object structure. There results an interferential contrast which makes the phase structure of the object examined appear, the variations in lighting in the image being proportional to the slope of optical thickness variations (due to the combined variations of the absolute thickness or of the index). The contrast thus obtained may be adjusted by a relative displacement of the prismatic blade and of the image of the slot source which is formed thereon or at a small distance therefrom.

It is always possible to obtain a contrast equal to unity for a given object. The latter being reproduced by the derivative of the normal contour of its emergent wave, appears on a coherent background, the phase of which is suitably adjusted. It is sufficient to observe the following general rule: the image of the slot is projected all the farther away from the black minimum of the achromatic fringe, as the difference in optical paths introduced by the detail examined in the object is greater. The relative displacement of the image source image and of the fringes of the main blade may be effected in various manners. There may be mentioned, by way of example, on the one hand, the effective displacement of the main blade or that of the slot-diaphragm, and, on the other hand, the displacement of the interference pattern of the main blade without changing its position; this latter displacement may be effected either by displacing the auxiliary blade when it is prismatic or by means of a bi-refringent compensator of any type and placed in the interval separating the two polarizers.

In order to increase the luminosity of images, one may contemplate omitting the diaphragm limiting the aperture of the optical lighting system. To this effect it is sufficient to give the auxiliary blade a special shape adapted to the shape of the main blade or bi-refringent wedge; this auxiliary blade may for instance be associated with the optical lighting system.

In the simplest case, which will be described by way of example, the two prismatic blades have the same angles and are cut, each one of them, with one face parallel with the axis of the crystal, the axes being, in addition, oriented 90° away from one another when, the blades being superposed, the edges of the prism are parallel. If one of these blades (auxiliary blade) is placed in the inlet pupil of the condenser and the other one (the main blade) in the outlet pupil of the objective having the same focal length as the condenser, the entire aperture of the lighting beam may be used without decreasing thereby the resulting contrast. Obviously, the blades must be oriented so that a light ray going through the auxiliary blades at any point of its effective aperture reaches a point of the main blade where bi-refringence is equal and opposite in sign to that offered by the auxiliary blade at the corresponding point.

Imagining a slot scanning the aperture of the prismatic auxiliary blade or bi-refringent wedge, it is easy to understand that the interference pattern localized on the main blade will be displaced at the same time as the image of the slot projected on it. There is thus no obstacle to a complete opening of the lighting beam since all rays contribute in the same manner to the interference phenomenon, which makes it possible to increase the light energy involved without blurring the interferential image.

The adjustment of the interferential contrast which must be adapted to the object studied is effected by the relative displacement, in the direction of the slopes of the crystal blades.

In order to be able to use the slotless arrangement described above in the case when the powers of the objective and condenser are in any ratio, it is necessary that the angles of the prismatic blades associated with these systems be respectively proportional to the powers of the objective and condenser. It is possible, also, to realise a crystal twin blade equivalent to a single prismatic blade with a variable angle. Such a doublet is comprised of two blades, the axes of which are crossed and one surface of which is convex or concave, spheroidal or cylindrical.

When the two blades are excentered, the resulting bi-refringence varies all the more rapidly as the excentricity is more important, and as the curvature at the apices is larger. A twin blade provided with a mechanism controlling the excentricity may be used advantageously as a universal auxiliary blade adaptable to prismatic main blades of any angle and associated with an observation optical system having any focal length. Nothing prevents the use of a twin blade of this type instead of a single main blade, which renders it possible to adjust at will the sensitivity of the device.

The device according to the invention also applies to an inspection in reflected light by means of suitable optical instruments. The position of the lighting system alone is involved in the changes which must be adopted in the design of the device.

Example may be taken of the microscope for the study of reflecting surfaces, in which the lighting beam is sent onto the object through the objective which also serves as a condenser.

A plane surface is considered normal, or substantially so, to the axis of the microscope; it is intended to study the quality of the surface by means of the interferential device according to the invention.

The focal lengths of the observation and lighting systems being identical, since here the same system plays the two parts successively, two blades or bi-refringent wedges of similar shapes are used. If these blades are prismatic, for instance, they are stuck together so as to constitute a plane and parallel faced blade. The inlet pupil to the condenser system coincides with the outlet pupil of the objective in the rear focal plane thereof; the stuck blades are located in said rear focal plane.

The contrast adjustment provided for detecting with an optimum sensitivity a selected class of lacks of planeity, is obtained either in the same manner as in the case of observation by transparence, or by an inclination of the sample.

The use of slightly prismatic blades is not exclusive. The symmetry with respect to a plane may be replaced by a symmetry of revolution with respect to the axis of the associated instrument. Consequently, all optical phenomena also offer this symmetry of revolution and in this case there is no directional effect in the formation of the contrast with which a variation of optical path introduced by the object is reproduced.

The simplest form to be given to at least one surface of the main blade or bi-refringent wedge is a spherical shape with a large radius respectively to the effective diameter, meridians other than circles not being excluded.

The auxiliary blade being plane and parallel, for instance, there are observed on the main blade, the interference rings already described by Biot. One of these circular fringes is achromatic (and black between the crossed polarizers) if the thickness of the auxiliary blade is intermediate between that at the center and that at the edge of the main blade. If the aperture of the condenser, limited to a fine ring (circular slot) is projected on the black fringe, the object is observed on the black background. The phase difference between the two phases polarized at right angle and concurrent on the image is equal to $\pi$. Due to the phase shift introduced by the object structure, there is an interest in getting away from the difference $\pi$; the deviation must be proportional to the importance of the local phase shift of the object.

As with blades, giving rectilinear fringes, the image of the ring source must be moved slightly away from the black fringe, but this time while preserving the symmetry of revolution. To this effect, it is sufficient to vary the relative diameters of the image of the lighting ring and of the interference fringe. One may use either a lighting system projecting, with a variable magnification, the image of its pupil on the objective pupil, or interpose between the polarizers, an adjustable bi-refringent compensator which, by producing an additional bi-refringence, will vary the diameters of the interference rings of the main blades or bi-refringent wedges.

Now there shall be considered the effect of the blade thickness on the constancy of the coherent background throughout the object field used. In a usual microscope, for instance, the half field angle seldom exceeds the value $\alpha = 1/15$.

A very simple calculation shows that quartz blades 0.5 mm. thick cause a phase variation of the order of $\pi/20$ from the center to the edge of the field. If a higher precision is desired, or if the field angle is more important, one resorts to combinations of crystal blade equivalent to single blades of zero thickness. They are obtained by cementing to blades with non parallel faces crystal blades cancelling the bi-refringence at the center of these first blades. The replacement of single blades by doublets complicates the arrangement somewhat, but allows the use of wide field instruments.

The present invention will be explained in more detail in the following specification, with reference to a number of examples shown in the accompanying drawings, in which: Fig. 1 is a diagrammatic sectional view through the optical axis of an apparatus comprising a polarization interferential device, providing two crystal blades which are both placed in the outlet pupil of the objective.

Figure 1:
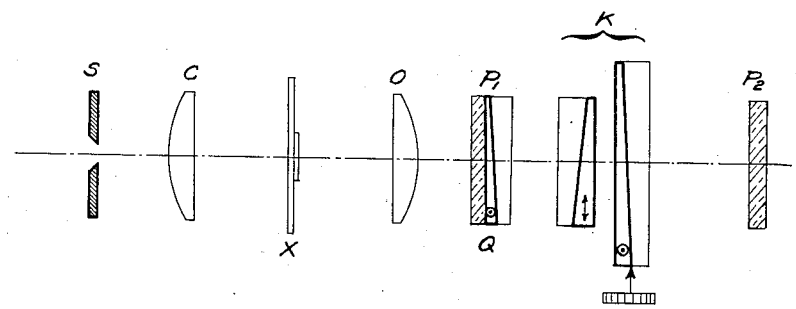

The arrangement shown in Fig. 1 is especially adapted to the study by transparence, of bodies which may offer a bi-refringence opposing its lighting by means of polarised light. In this figure, there is seen the light source under the form of a slot S, the condenser C acting as a collimator, the object $x$ located perpendicularly to the light beam, the objective O and, in its outlet pupil, the interferential polarization system consisting of a polarizer $P_1$, a main blade or birefringent wedge Q, a compensator K and a second polarizer $P_2$. Such a mounting provides the following possible actual characteristics. The focal lengths of the two interchangeable objectives O of the microscope are, for instance, 16 mm. and 8 mm., that of the condenser C, acting as a collimator, 25 mm. The optical length of the tube is 180 mm. The main blade Q is made of quartz, parallel with the axis, with a thickness 0.5 mm. at the center. On the drawing, the orientation of its crystallographic axis is perpendicular to the plane of the figure. It is cut at a bevel with a 1° angle and completed by a glass blade having the same angle.

Identical blades are used for both objectives, and it will be assumed that they have a positive sign. The quartz elements are then mounted in the focal planes of these objectives. The compensator K is housed in the tube of the microscope; it consists of two slightly prismatic blades cut in a plane parallel with the axis. The orientation of the latter is parallel with the plane of the figure in the first blade and perpendicular to that plane in the second blade. The angle of the bevels is of the order of 20'. The thickness of the first blade is 1.5 mm. and that of the second blade 1 mm., the difference serving to cancel the bi-refringence at the center of the blade Q. The two polarizers $P_1$ and $P_2$ are of the dichroic type, similar to a polarizing film of the "Polaroid" type. Each of the polarizers is mounted between two blades. They are oriented at 45° to the plane of the figure and crossed.

The contrast adjustment is effected by a displacement of the quartz movable bevel of compensator K.

Figure 2:
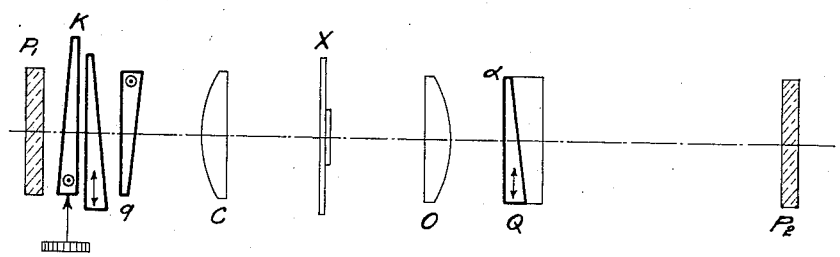
Fig. 2 shows a diagrammatic sectional view of an apparatus used for the observation by transmission of isotropic bodies. It comprises two prismatic crystal blades, associated, one with the condenser and the other one with the objective and makes it possible to use the lighting beam aperture without any restrictive diaphragm.

Referring now to Fig. 2, we shall give the characteristics of design for the simplest mounting, making it possible to use the full aperture of the lighting beam. In this case the blade $q$, is placed in the front focal plane of condenser C, the focal length of which is 16 mm., and the aperture sin $u$ about 0.50. Two blades are prepared, 0.5 mm. thick, and with respective angles 1° and 30', used with the two objectives O having the focal lengths 16 and 8 mm.; both comprising identical baldes with a 1° angle and 0.5 mm. thick. The orientations of blades $q$ and Q are that shown in the drawing.

The contrast is adjusted by means of the compensator K using quartz bevels of identical shapes, one of which can be displaced. Said adjustment can obviously be effected by acting on the blade $q$, the compensator K being omitted.

Figure 3:
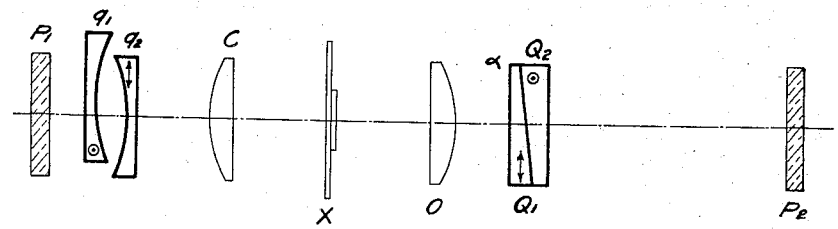
Fig. 3 is a diagrammatic sectional view showing an auxiliary twin blade playing the part of a variable angle prism, thus allowing use of objectives and prismatic main blades of any characteristics.

In order to prevent changing of blades $q$, a universal auxiliary blade may be used, equivalent to a single prismatic blade with a variable dihedral angle. Said modification is shown in Fig. 3. Such a universal blade is composed of two blades $q_1$ and $q_2$, the axes of which are crossed and one face of which is curved, concave in the case of the figure. When these two blades are excentered by an amount $m$, the assembly acts like a prismatic blade with an angle $$\alpha = \frac{m}{R}$$

R being the radius of curvature of the blades $q_1$ and $q_2$. A radius R of about 50 mm. is quite adapted to this case.

In view of the zero bi-refringence at the center of the auxiliary blade or birefringent wedge, a main blade should be used which is composed of two elements and the bi-refringence of which is also compensated at its center. To have conditions similar to the previous case, the blade Q will consist here, of two prismatic blades $Q_1$ and $Q_2$, each with an angle 30' and assembled as shown in the figure.

Figure 4:
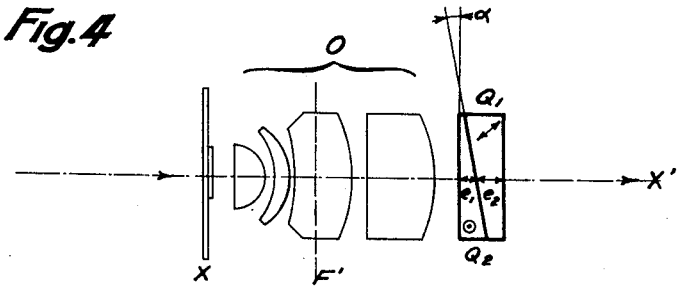
Fig. 4 represents in diagrammatic cross section, a powerful microscope objective of a common type, the pupil of which (rear focal plane) is not accessible.

In the case of Fig. 4, a main blade or birefringent wedge consisting in to prismatic blades is associated with a powerful microscope objective, the crystallographic orientation of which causes a shifting of the plane of fringe localization at the necessary distance allowing a convenient relisation of the device; Fig. 4 shows a practical solution for adapting a main blade to an objective the rear focal plane of which is not accessible. For a good operation of the apparatus, without complicating too much the usual microscope, the interference fringes should be localized in that plane. To this aim a prismatic blade is used, one face of which is cut perpendicularly to the principal plane, containing the axis and making a certain angle therewith. The quartz blade $Q_1$ has its axis inclined by 45°; its dihedron is 30' and the thickness at the center 1 mm.; the blade $Q_2$ is cut parallel to the axis, its thickness being 0.5 mm., which is sufficient for compensating the bi-refringence (twice as low) of $Q_1$. In these conditions, the localization plane for the fringes is shifted about 30 mm. (measured in air). If this shift is too great, the inclination of the axis of $Q_1$ may be decreased.

Figure 5:
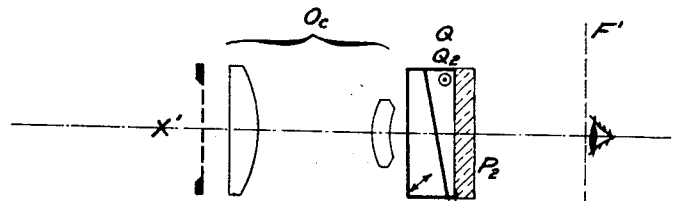
Fig. 5 shows a diagrammatic section of the observation pupil provided with the polarization interferential device placed in its outlet pupil. A prismatic crystal blade is used, similar in construction to that described in relation to Fig. 4.

Such an arrangement, with said remarkable property of localization of the interference phenomena, is applicable in the modified embodiment shown in Fig. 5, where a particular position of the crystallographic axis makes it possible to shift the plane of localization of interferences and thus to preserve a convenient ocular drawing for the observer.

If it is desired to apply the method of interferential contrast to an ordinary microscope without acting on the objectives, the blade Q may be placed in the outlet pupil of the observation eye-piece O$o$ (see Fig. 5). This pupil however, is occupied by the observer's eye and it is much more convenient to have the localization plane for the fringes which must touch the pupil of the eye, come out of Q, this time in the other direction.

For example, a blade or birefringent wedge Q is placed in front of an ocular with a magnification 5, said blade consisting of a blade $Q_1$, with a 1°30′ angle the axis of which is inclined 45°, the thickness at the center of $Q_1$ being 1.5 mm. and a blade $Q_2$ with a thickness at the center of 0.75 mm., and cut parallel with the axis. The polarizer $P_2$ completes the mounting which may be used with a lighting apparatus represented on Figures 1, 2 or 3.

Figure 6:
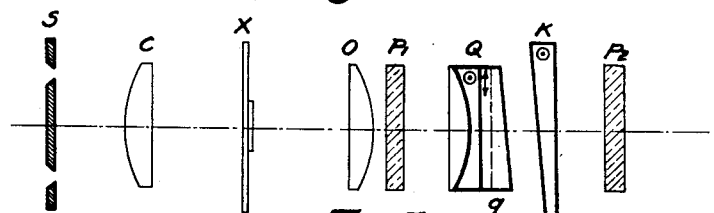
Fig. 6 shows a sectional view of an apparatus similar to that represented in Fig. 1, but using a main blade, the shape of which has an axis of revolution.

The apparatus, a diagrammatic section of which is represented in Fig. 6, uses a main blade Q one of which is concave. In the case of an usual microscope, said blade is placed in the outlet pupil of the objective O. As a concrete example, the radius of curvature of this blade is of about 75 mm. when made of quartz and 1400 mm. when made of spar. The blade is cut parallel with the axis which is perpendicular to the plane of the figure on the diagram of the Fig. 6. Its minimum thickness is 1 mm. for instance; if the prismatic blade of the compensator K has an average thickness 1 mm. The auxiliary blade $q$ must compensate both the blade Q and the prismatic blade of the compensator K oriented in the same manner, hence its thickness equal to the sum of these latter, i.e. 2 mm. As the localized fringes of equal bi-refringement are circular, an annular source S is used in this case, which is placed in the inlet aperture of the condenser C in a manner similar to the case of a phase contrast microscope of conventional type.

To put the device in operation, it is sufficient to adjust the relative diameters of the image of S on the blade Q and of the black achromatic fringe, $P_1$ and $P_2$ being crossed. The thickness of the plano-concave blade varies from center to edge according to an approximate law $$e = e_0 + \frac{h^2}{2R}$$

$h$ being the distance from the work point to the center and $e_0$ designating the thickness at the center. If the radius of the image of S is $h$, it is sufficient to give the difference in thickness of the blades K and $q$, a value equal to $e$ for obtaining a black interferential background. A variation of $32\mu$ in the thickness of quartz corresponding to a change of $\lambda/2$, it is sufficient to vary the thickness of $e_q + e_K$ by $\pm 15\mu$ about the value $e$ corresponding to compensation, to obtain all possible aspects of achromatic interferential contrast, so that it will be possible to select the phase shift value best adapted to the object studied. Such a mounting may also be realized with prismatic blades; in this case, the variation law of thickness of the main blade or birefringent wedge Q is a linear one, instead of the parabolic as in the foregoing example.

Figure 7:
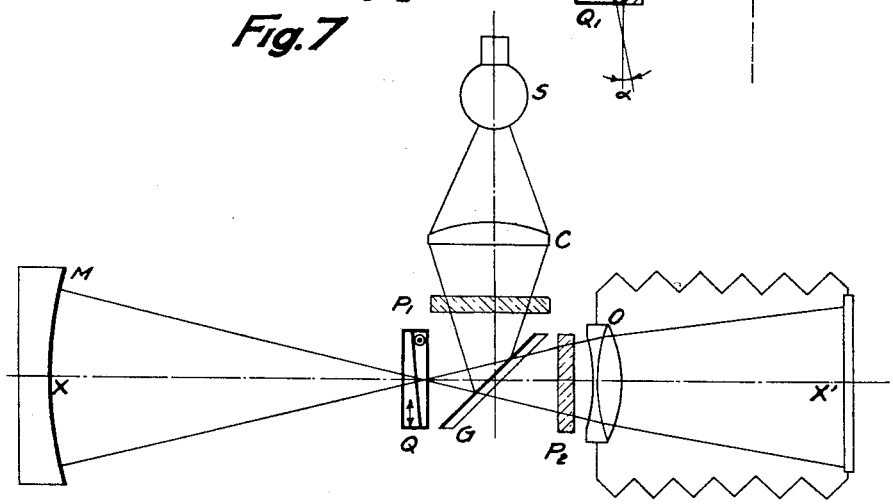
Fig. 7 shows, schematically at a great scale, a photographic apparatus for studying, in reflected light, either the quality of optical surfaces or striations in gaseous or liquid materials.

The device according to the present invention may further, as will be now shown with reference to Fig. 7, be used for photograph recording of images. In this case, the light is sent through a semi-transparent glass G, on the blade Q, of a prismatic type, for instance, which is at the center of curvature of a mirror M, of which the quality of surface is to be studied. The mirror M is of the auto collimating type. The light is sent back by reflection and goes a second time through the blade Q; a photographic camera aimed at the surface of the mirror M completes the arrangement.

Such an apparatus may also be used for the observation of striation. A mirror M of good quality is sufficient and there is made use of the space included between M and Q for studying striations of gaseous or liquid bodies. The arrangement is particularly suitable for the studying of short phenomena, owing to its high luminosity. Contrary to all known mountings it uses a non collimated light beam without decreasing the sensitivity obtained.

Figure 8:
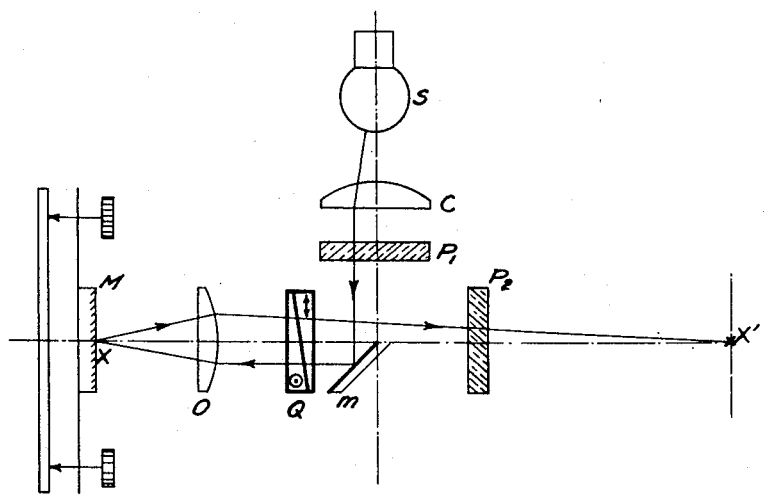
Fig. 8 shows a diagrammatic section of a so-called metallographic microscope using the device according to the invention, and making possible the obtention of an image with an interferential contrast without any collimation of the lighting beam.

Figure 8 shows a device according to the invention as applied to a conventional metallographic microscope. A source (which is not necessarily a point source) directs light through a condenser C and polarizer $P_1$ onto a small opaque mirror M (which extends only below the axis of the objective O). The light is then reflected to the lower half of the blade or bi-refringent wedge Q which is disposed in the focal plane of the objective O, should this objective be accessible. The light reflected by the object X crosses the upper half of the blade or bi-refringent wedge Q after having recrossed the objective O and produces an image at X′. The polarizer $P_2$ is placed in the usual relation to the polarizer $P_1$, i.e. perpendicular to the latter. In case the objective O is not accessible, a main blade such as shown in Figure 4 may be employed.

Figure 9:
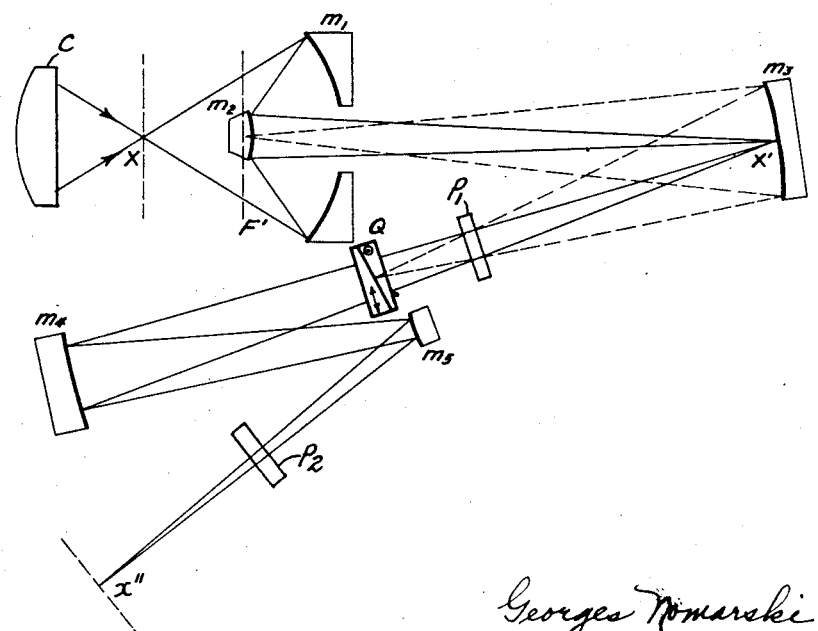
Fig. 9 shows a possible arrangement of the main crystal blade in a system using pure reflection.

Example represented at Figure 9 is particularly suitable for research in a wide spectral field. The scheme is that of a compound microscope with pure reflection: The mirrors $m1$ and $m2$ constitute the mirror-type objective, mirror $m3$ plays the part of a field glass and is a concave mirror which acts as a reflecting mirror objective which makes the outlet pupil of the objective accessible by forming its real image on the main blade Q after passing through polarizer $P_1$. The image X′ of the object X is then taken by the system of mirrors $m4$ and $m5$, of the Cassegrain type, oblique, playing the part of the projection ocular and forming the final image at X″ after passing through polarizer $P_2$. The application of the device to ultra-violet and infrared rays, as well as in the visible spectrum, is quite indicating and very advantageous in view of the strict achromatism of the interference phenomena involved, and of the spectral transparency of the natural crystal blade in blade Q.

What I claim is:

1. Interferential polarizing device comprising, in optical alignment, a source of light giving a coherent illumination, a means for supporting a phase object, an optical system giving a real image of the source, said image being located after the object in the direction of the light beam, an interferential polarizing system having two polarizers and at least one main bi-refringent wedge placed perpendicularly to said beam, after the object and between said polarizers, the fringes caused by said system being localized on the image of the source, the image of the source being located on said bi-refringement wedge, and an ocular system for receiving the effective image of the phase object, the pupil of said ocular system being at a small distance from said main bi-refringement wedge.

2. Interferential polarizing device comprising, in optical alignment, a source of light giving a coherent illumination, a means for supporting a phase object, an optical system giving a real image of the source, said image being located after the object in the direction of the light beam, two polarizers, at least one main bi-refringent wedge between said polarizers and placed perpendicularly to said beam after the object, the image of the source being located on said bi-refringent wedge, at least one auxiliary bi-refringent wedge disposed perpendicularly to said beam between said polarizers, the fringes caused by said system being localized on the image of the source, the respective bi-refringences at the centers of said main and auxiliary bi-refringent wedges being of equal and opposite signs, and an ocular system for receiving the effective image of the phase object, the pupil of said ocular system being at a small distance from said main bi-refringent wedge.

3. Interferential polarizing device comprising, in optical alignment, a source of light giving a coherent illumination, means for supporting a phase object, an optical system giving a real image of the source, said image being located after the object in the direction of the light beam, two polarizers, at least one main bi-refringent wedge between said polarizers and placed perpendicularly to said beam after the object, the image of the source being located on said bi-refringent wedge and one auxiliary bi-refringent wedge placed at a point between said two polarizers, said auxiliary bi-refringent wedge having one planar surface adjacent and parallel to a corresponding surface of said main bi-refringent wedge, said bi-refringent wedges providing a system of interference fringes localized on the image of the source.

4. Interferential polarizing device comprising, in optical alignment, a source of light giving a coherent illumination, means for supporting a phase object, an optical system giving an image of the source, said image being located after the object in the direction of the light beam, two polarizers, a main bi-refringent wedge between said polarizers and placed perpendicularly to said beam after said object, the image of the source being located on said bi-refringent wedge, an auxiliary bi-refringent wedge between said polarizers and placed perpendicularly to said beam and an ocular system for receiving the effective image of the phase object, the fringes caused by said system being localized on the image of the source, the pupil of said ocular system being at a small distance from said main bi-refringent wedge.

5. Interferential polarizing device comprising, in optical alignment, a source of light giving a coherent illumination, means for supporting a phase object, an optical system giving a real image of the source, said image being located after the object in the direction of the light beam, two polarizers, a prismatic main bi-refringent wedge between said polarizers the image of the source being located on said bi-refringent wedge, said bi-refringent wedge having its crystallographic axis inclined to the polished surface of said wedge, the fringes caused by said system being localized on the image of the source and an ocular system for receiving the effective image of the phase object, the pupil of said ocular system being at a small distance from said main bi-refringent wedge.

6. Interferential polarizing device comprising, in optical alignment, a source of light giving a coherent illumination, means for supporting a phase object, an optical system giving a real image of the source, said image being located after the object in the direction of the light beam, two polarizers, a main prismatic bi-refringent wedge, between said polarizers and placed perpendicularly to said beam after the object, the image of the source being located on said bi-refringent wedge, the fringes caused by said system being localized on the image of the source, an ocular system for receiving the effective image of the phase object, said main bi-refringent wedge being located before said ocular.

7. Interferential polarizing device comprising, in optical alignment, a source of light giving a coherent illumination, means for supporting a phase object, an optical system giving a real image of the source, said image being located after the object in the direction of the light beam, two polarizers, a main bi-refringent wedge between said polarizers and placed perpendicularly to the beam after the object, the image of the source being located on said bi-refringent wedge, the fringes caused by said system being localized on the image of the source, two associated bi-refringent lenses each having one plane face, the neutral lines of said lenses being in a crossed relation, and including means for adjusting the eccentricity of the said lenses, and an ocular system for receiving the effective image of the phase object, the pupil of the said ocular system being at a small distance from the said main bi-refringent wedge.

8. Interferential polarizing device comprising, in optical alignment, a source of light giving a coherent illumination, means for supporting a phase object, an optical system giving a real image of the source, said image being located after the object in the direction of the light beam, two polarizers, a main bi-refringent wedge between said polarizers and placed perpendicularly to the beam after the object, the image of the source being located on said bi-refringent wedge, the fringes caused by said system being localized on the image of the source, two associated bi-refringent plano-concave lenses, the neutral lines of said lenses being in a crossed relation and including means for adjusting the eccentricity of said lenses, and an ocular system for receiving the effective image of the phase object, the pupil of said ocular system being at a small distance from said main bi-refringent wedge.

9. Interferential polarizing device comprising, in optical alignment, a source of light giving a coherent illumination, means for supporting a phase object, an optical system giving a real image of the source, said image being located after the object in the direction of the light beam, two polarizers, a main bi-refringent wedge between said polarizers and placed perpendicularly to the beam after the object and the image of the source being located on said bi-refringent wedge, the fringes caused by said system being localized on the image of the source, a bi-refringent wedge cemented to said main bi-refringent wedge and compensating said main bi-refringent wedge, and an ocular system for receiving the effective image of the phase object, the pupil of said ocular system being at a small distance from said main bi-refringent wedge.

10. Interferential polarizing device comprising in optical alignment, a source of light giving a coherent illumination, means for supporting a phase object, an optical system giving a real image of the source, said image being located after the object in the direction of the light beam, two polarizers, a curved main bi-refringent wedge between said polarizers and placed perpendicularly to said beam after the object, the image of the source being located on said bi-refringent wedge, the fringes caused by said system being localized on the image of the source, a flat thin compensator acting as a bi-refringent parallel wedge of variable thickness, and an ocular system for receiving the effective image of the phase object, the pupil of said ocular system being at a small distance from said main bi-refringent wedge.

11. In combination with a microscope objective, an interferential polarizing device comprising, in optical alignment, a source of light giving a coherent illumination, means for supporting a phase object, an optical system giving a real image of the source, said image being located after the object in the direction of the light beam, two polarizers, one double bi-refringent wedge between said polarizers and having at its center a zero bi-refringence and the image of the source being located on said bi-refringent wedge, and an ocular system for observing the interference phenomenon.

12. Interferential polarizing device comprising, in optical alignment a source of light giving a coherent illumination, an optical system giving a real image of said source, a polarizer, a semi-transparent reflecting mirror, means for supporting a phase object, a concave mirror, a double adjustable main bi-refringent wedge placed at the center of curvature of said mirror and having located thereon the image of the source, a second polarizer, and an ocular system for receiving the effective image of the phase object, the pupil of said ocular system being at a small distance from the center of curvature of said concave mirror, said supporting means being between said wedge and said concave mirror.

13. Interferential polarizing device comprising, in optical alignment, a source of light giving coherent illumination, two polarizers, means for supporting a phase object, an optical system giving a real image of the source at the object, said system being a pure reflective optical system and consisting of a mirror-type objective, and a concave mirror; a main bi-refringent wedge placed at the center of curvature of said concave mirror, and having located thereon a secondary image of said real image of the source, said wedge being between said two polarizers, and an oblique optical mirror system serving as a projection ocular for giving the definitive image in the image plane thereof.

References Cited in the file of this patent

UNITED STATES PATENTS

| | | |
|---|---|---|
| 942,393 | Konig | Dec. 7, 1909 |
| 2,460,515 | Lowber et al. | Feb. 1, 1949 |
| 2,516,905 | Osterberg et al. | Aug. 1, 1950 |
| 2,601,175 | Smith | June 17, 1952 |
| 2,660,922 | Philpot | Dec. 1, 1953 |
| 2,732,759 | Osterberg | Jan. 31, 1956 |
| 2,777,360 | Blaisse | Jan. 15, 1957 |
| 2,785,601 | Francon | Mar. 19, 1957 |

FOREIGN PATENTS

| | | |
|---|---|---|
| 648,801 | Great Britain | Jan. 10, 1951 |

OTHER REFERENCES

"The Polanret Microscope," Journal of the Optical Society of America, vol. 37, No. 9, September 1947, pages 726–730, Osterberg.

"Microscope Interferential Par Double Refraction A Source Annulaire," by M. Francon, Review d'Optique, vol. 31, No. 4, pages 170–176, 195–196, April 1952.